United States Patent [19]
Iinuma et al.

[11] Patent Number: 5,784,097
[45] Date of Patent: Jul. 21, 1998

[54] THREE-DIMENSIONAL IMAGE DISPLAY DEVICE

[75] Inventors: Toshiya Iinuma, Moriguchi; Haruhiko Murata, Takatsuki; Seiji Okada, Moriguchi; Akihiro Maenaka, Kadoma, all of Japan

[73] Assignee: Sanyo Electric Co., Ltd., Osaka, Japan

[21] Appl. No.: 622,298

[22] Filed: Mar. 25, 1996

[30] Foreign Application Priority Data

Mar. 29, 1995 [JP] Japan ................. 7-071980

[51] Int. Cl.$^6$ ................................. H04N 13/02
[52] U.S. Cl. ................. 348/43; 348/42; 348/51
[58] Field of Search .................. 348/42, 45, 47, 348/43, 51, 52

[56] References Cited

U.S. PATENT DOCUMENTS

| | | | |
|---|---|---|---|
| 4,851,901 | 7/1989 | Iwasaki . | |
| 5,175,616 | 12/1992 | Milgram et al. | 348/47 |
| 5,428,386 | 6/1995 | D'Alfonso et al. | 348/45 |
| 5,510,832 | 4/1996 | Garcia | 348/51 |

FOREIGN PATENT DOCUMENTS 0 285 315 A2  10/1988  European Pat. Off. .
0 524 462 A2  1/1993  European Pat. Off. .
2 654 291  5/1991  France .

OTHER PUBLICATIONS

Patent Abstracts of Japan, vol. 96, No. 002 & JP-A-08 030806, Feb. 2, 1996.
Patent Abstracts of Japan, vol. 95, No. 008 & JP-A-07 226959, Aug. 22, 1995.
Patent Abstracts of Japan, vol. 95, No. 010 & JP-A-07 274216, Oct. 20, 1995.

*Primary Examiner*—Tommy P. Chin
*Assistant Examiner*—Luanne P. Din
*Attorney, Agent, or Firm*—Nikaido, Marmelstein, Murray & Oram LLP

[57] ABSTRACT

A left eye image signal and a right eye image signal which constitute a three-dimensional image are produced from a two-dimensional image signal. The horizontal phase of the produced left eye image signal is shifted, and the horizontal phase of the produced right eye image signal is shifted. Character signals are respectively mixed with the left eye image signal and the right eye image signal. A composite image comprising the three-dimensional image and the character signal is displayed on the basis of the left eye image signal with which the character signal is mixed and the right eye image signal with which the character signal is mixed.

1 Claim, 8 Drawing Sheets

THREE-DIMENSIONAL IMAGE DISPLAY DEVICE

BACKGROUND OF THE INVENTION

1. Field of the Invention

The present invention relates to a three-dimensional (3D) image display device on which a pseudo three-dimensional (3D) image produced by subjecting a two-dimensional (2D) image to signal processing and a three-dimensional (3D) image picked up using two cameras or the like are displayed.

2. Description of the Prior Art

Most of 3D image software used in a 3D image display system which has been recently topical is produced particularly for the 3D image display system. Such 3D image software is generally recorded by picking up a left eye image and a right eye image using two cameras. The left eye image and the right eye image which are recorded on the 3D image software are displayed on one display. The left eye image and the right eye image which are projected are separately incident on the left eye and the right eye of a viewer, whereby the viewer recognizes a 3D image.

A lot of types of 2D image software currently exist. If 3D image software can be produced from the 2D image software, therefore, time and labor required to produce 3D image software having the same contents as those of the existing 2D image software again from the beginning are conserved.

Consequently, a method of converting 2D images into 3D images has been already proposed. Specifically, in the case of a 2D image in which an object moving from the right to the left against a background is projected, the original 2D image is taken as a right eye image, and an image corresponding to a field which is several fields preceding a field corresponding to the right eye image is taken as a left eye image. This method is referred to as a method of producing 3D images using field delay. Consequently, binocular parallax occurs between the left eye image and the right eye image. If both the images are displayed on a screen, and the left eye image and the right eye image are respectively viewed with the left eye and the right eye of the viewer, therefore, the moving object is recognized as if it jumped out forward from the background.

In the above described method, a 3D image having binocular parallax can be obtained when the original 2D image is a moving image which horizontally moves by not less than a predetermined amount. In the above described method, however, a 3D image having binocular parallax cannot be obtained when the original 2D image is a still image, when the original 2D image vertically moves but does not horizontally move, or when the original 2D image hardly horizontally moves.

As a method of solving such a problem, the applicant of the present invention has developed a method of producing a 3D image utilizing an inputted 2D image and an image obtained by shifting the phase of the 2D image, and has already filed at the Japanese Patent Office (see Japanese Patent Application No. 6-162259, which has not been laid-open yet). The method involves converting 2D images into 3D images for producing a 3D image having a right eye image and a left eye image on the basis of an inputted 2D image, comprising: taking the inputted 2D image and an image delayed from the inputted 2D image along the time base as the right eye image and the left eye image respectively if the inputted 2D image is a moving image, thereby producing the 3D image; and taking the inputted 2D image and an image in which a horizontal phase of the inputted 2D image is shifted as the right eye image and the left eye image respectively if the inputted 2D image is a still image, thereby producing the 3D image.

The inputted 2D image is judged as the moving image when a horizontal component of a motion vector is more than a predetermined value, and the inputted 2D image is judged as the still image when the horizontal component of the motion vector is not more than the predetermined value.

According to this method, an inputted 2D image and an image delayed from the inputted 2D image along the time base are taken as a right eye image and a left eye image respectively if the inputted 2D image is a moving image, thereby producing a 3D image. Further, in the case of a still image or a moving image which moves vertically but hardly moves horizontally, both of which can not obtain stereo effect using the above described method, the inputted 2D image and an image in which a horizontal phase of the inputted 2D image are taken as the right eye image and the left eye image respectively, thereby producing the 3D image. Therefore, any kind of the inputted 2D images can be converted into the 3D images.

Figure 7A:
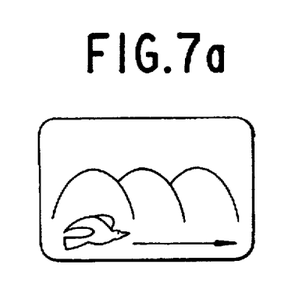
FIG. 7 is a diagram showing the principle of the method of converting 2D images into 3D images with regard to a moving image.
Figure 7B:
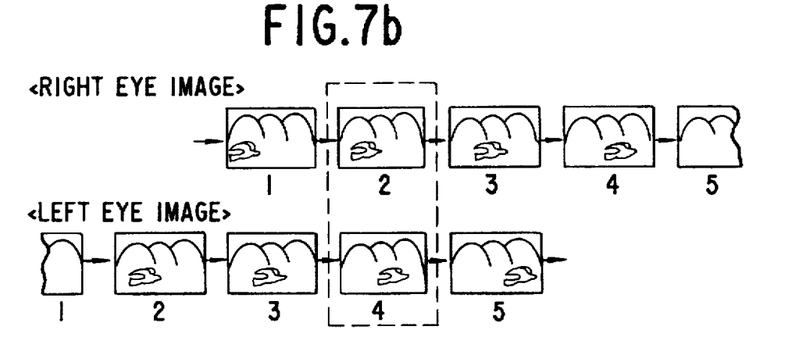
Figure 7C:
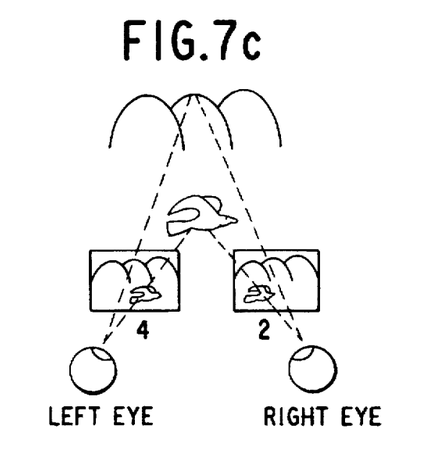

A principle of stereoscopic vision will be described. In an image scene where the background does not change but the subject moves from the left to the right as shown in FIG. 7a, if there is provided a given time difference by field delay between the reproduced right and left eye images as illustrated in FIG. 7b, the position of the subject in each of the right eye image and the left eye image differs by the amount corresponding to the speed at which the subject moves. This creates binocular parallax as shown in FIG. 7c, whereby the subject is recognized as if projected forward. Thus, stereoscopic vision can be achieved. The numerals given in FIGS. 7b and 7c indicate field numbers.

In the above described principle, a still image or a moving image which moves vertically but hardly moves horizontally can not be converted into a 3D image.

This method can achieve stereoscopic vision even for the still image according to the following principle. That is, it is achieved by controlling a phase of images incident upon left and right eyes so that the left eye image and the right eye image may be horizontally shifted from each other by a predetermined amount. Specifically, the screen-wide image is shifted to the right for the right eye image, and to the left for the left eye image, whereby the subject is recognized as if it existed behind the screen surface. Furthermore, the screen-wide image is shifted to the left for the right eye image, and to the right for the left eye image, whereby the subject is recognized as if it existed ahead of the screen surface.

Figure 8:
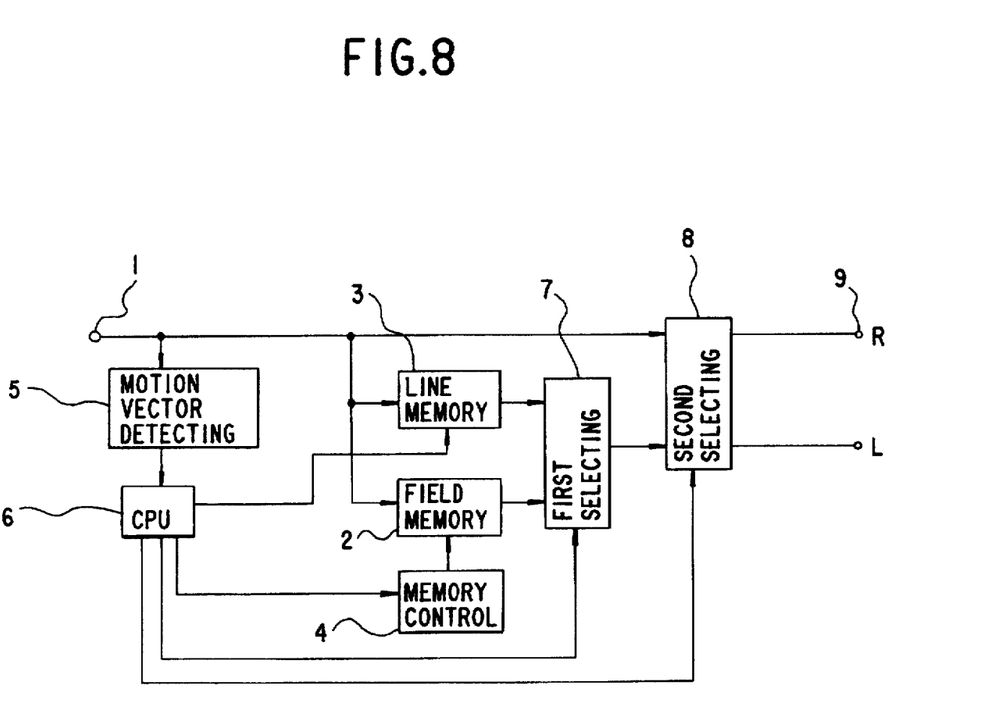
FIG. 8 is a block diagram showing a system for converting 2D images into 3D images.

Referring now to the drawings, one embodiment of this method will be described in detail. FIG. 8 is a rough block diagram showing the main section of a system for converting 2D images into 3D images. A 2D image signal is inputted into an input terminal 1. The 2D image signal is supplied to a field memory 2 and a line memory 3. The field memory 2 is controlled by a memory controlling circuit 4 so that delay may be varied for each field in the range of 0 to a maximum of 60 fields (approximately 1 second in NTSC (National Television System Committee)). The line memory 3 is capable of adjusting a horizontal phase of the input image by delaying the input signal for an arbitrary time within one horizontal scanning period. This phase adjustment is made through a CPU 6.

Output from the field memory 2 and output from the line memory 3 are supplied to a first selecting circuit 7, which selects either one of the output using a still image judging signal described later and outputs it.

Moreover, the inputted 2D image signal is also supplied to a motion vector detecting circuit 5, which detects a motion vector corresponding to the movement between fields of the 2D image signal and then supplies the motion vector to the CPU 6. The CPU 6 extracts a horizontal component from the motion vector and controls the memory controlling circuit 4 according to the extracted horizontal component. Specifically, if the movement of the subject is large, that is, the motion vector is large, the memory controlling circuit 4 is controlled so that the delay in the field memory 2 may be decreased. If the movement of the subject is small, or the motion vector is small as at the time of slow-motion reproduction, the memory controlling circuit 4 is controlled so that the delay in the field memory 2 may be increased. Field delay in the field memory 2 is a maximum of sixty fields, which correspond to one second in the NTSC system, and one second can almost correspond to a normal image scene. In the case of lower-speed slow-motion reproduction, however, a large-capacity memory comprising sixty fields or more may be used.

Furthermore, the CPU 6 judges on the basis of the motion vector whether the input image is a still image or a moving image. Specifically, the CPU produces the still image judging signal of "1" when the horizontal component of the motion vector is not more than a predetermined value, while the CPU produces the still image judging signal of "0" when the horizontal component of the motion vector exceeds the predetermined value, to supply the still image judging signal to the first selecting circuit 7. The first selecting circuit 7 selects the output of the line memory 3 when the still image judging signal of "1" is inputted therein, and selects the output of the field memory 2 when the still image judging signal of "0" is inputted therein, to supply the output to a second selecting circuit 8. This second selecting circuit 8 to which the inputted 2D image signal and the output of the first selecting circuit 7 are inputted, is controlled by a control signal from the CPU 6. Specifically, if the motion vector is directed from the left to the right, the second selecting circuit 8 is controlled to take the inputted 2D image signal as a left eye image signal and the output of the first selecting circuit 7 as a right eye image signal. If the motion vector is directed from the right to the left, the second selecting circuit 8 is controlled to take the inputted 2D image signal as the right eye image signal and the output of the first selecting circuit 7 as the left eye image signal.

Next, detailed description will be made of the operation of the above-mentioned system shown in FIG. 8. If the inputted 2D image signal is a moving image, the motion vector is detected in the motion vector detecting circuit 5. The CPU 6 controls the field memory 2 through the memory controlling circuit 4 so that the field delay may be small if the motion vector is large and the field delay may be large if the motion vector is small.

Furthermore, when the motion vector exceeding a predetermined value is detected, the CPU 6 judges the inputted 2D image as a moving image and supplies the still image judging signal of "0" to the first selecting circuit 7. Therefore, the first selecting circuit 7 selects the output of the field memory 2 to supply it to the second selecting circuit 8. If the motion vector is directed from the left to the right, the second selecting circuit 8 is controlled by the control signal from the CPU 6 to take the inputted 2D image signal as a left eye image signal and the output of the first selecting circuit 7 as a right eye image signal, and then outputs the right eye image signal and the left eye image signal to output terminals 9 and 10 respectively. If the motion vector is directed from the right to the left, the second selecting circuit 8 is controlled by the control signal from the CPU 6 to take the inputted 2D image signal as the right eye image signal and the output of the first selecting circuit 7 as the left eye image signal, and then outputs the right eye image signal and the left eye image signal to the output terminals 9 and 10 respectively.

In the case of the moving image, therefore, there occurs binocular parallax corresponding to the speed of the movement between the right eye image signal and the left eye image signal in a scene where the subject moves horizontally, according to the principle shown in FIGS. 7a through 7c. Moreover, if the right and left eye image signals from the output terminals 9 and 10 are supplied to a 3D display by a lenticular method, for example, a pseudo 3D image partially having stereo effect can be reproduced even from a 2D image signal.

Next, description will be made of the case where the input image is a still image. The motion vector detected in the motion vector detecting circuit 5 is 0 or not more than a predetermined value. In this case, the CPU 6 judges the input image as the still image and supplies the still image judging signal of "1" to the first selecting circuit 7. Therefore, the first selecting circuit 7 selects the output of the line memory 3 and supplies it to the second selecting circuit 8. The second selecting circuit 8 keeps the previous state when the motion vector is 0.

Figure 6A:
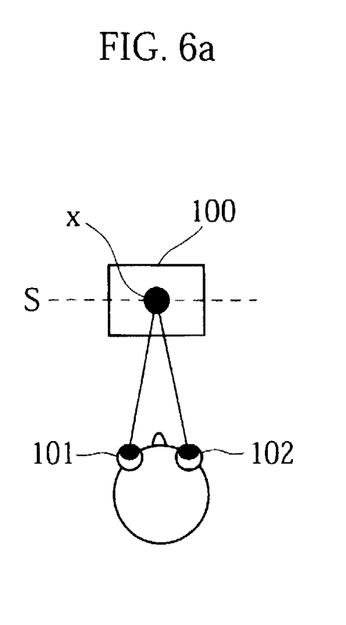
FIGS. 6a, 6b and 6c are illustrations for explaining the principle of 3D view by phase shift.
Figure 6B:
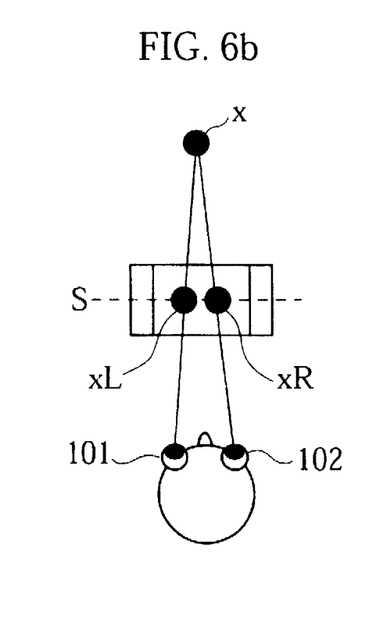
Figure 6C:
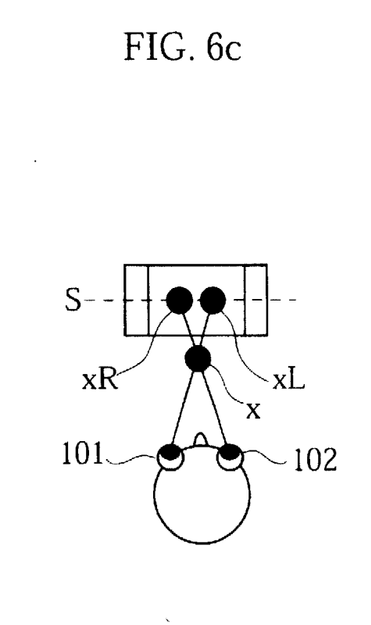

In the case of the still image or the moving image which hardly moves, therefore, the images which are horizontally shifted from each other by a predetermined amount are incident on the right eye and the left eye respectively, whereby stereo effect can be obtained, according to the principle illustrated in FIGS. 6a through 6c. This method will be described on the basis of FIGS. 6a, 6b and 6c.

It is assumed that a still image is displayed as it is on a display device. In this case, even if an object x displayed on a monitor surface S of a display device 100 is viewed with the left eye 101 and the right eye 102 of a viewer, there occurs no binocular parallax, as shown in FIG. 6a, whereby it is impossible to view the object x with a 3D effect.

As shown in FIG. 6b, therefore, the whole of the still image is shifted to the left by a predetermined amount to produce a left eye image, and the whole of the still image is shifted to the right by a predetermined amount to produce a right eye image. When an object xL in the left eye image is viewed only with the left eye 101 and an object xR in the right eye image is viewed only with the right eye 102, there occurs binocular parallax, whereby the object x is recognized as if it existed in the position where lines of sight of the eyes intersect each other. In this case, the object x is recognized as if it existed behind the monitor surface S, whereby an image with a 3D effect is obtained.

As shown in FIG. 6c, the whole of the still image is shifted to the right by a predetermined amount to produce a left eye image, and the whole of the still image is shifted to the left by a predetermined amount to produce a right eye image. When an object xL in the left eye image is viewed only with the left eye 101 and an object xR in the right eye image is viewed only with the right eye 102, there occurs binocular parallax, whereby the object x is recognized as if it existed in the position where lines of sight of the eyes intersect each other. In this case, the object x is recognized as if it existed ahead of the monitor surface S, whereby an image with a 3D effect is obtained.

A left eye image and a right eye image are produced by a method of producing 3D images using field delay even with respect to an image which horizontally moves by not less than a predetermined amount, after which the horizontal phases of the left eye image and the right eye image are respectively shifted, whereby the whole of a 3D image obtained by the method of producing 3D images using field delay can be moved forward or backward from the monitor surface. Specifically, the amount of horizontal phase shift is changed, whereby a reference surface of the 3D image obtained by the method of producing 3D images using field delay can be moved forward or backward from the monitor surface to adjust the amounts of forward projection and backward projection of the whole of the 3D image from the monitor surface.

When the 3D image produced by the horizontal phase shift is subjected to horizontal phase shift, the viewer cannot easily know where the reference surface of the 3D image is positioned with respect to the monitor surface and cannot easily experience a 3D effect. Further, the amounts of forward projection and backward projection of the 3D image are difficult to adjust.

Furthermore, even when the 3D image picked up using two cameras is subjected to horizontal phase shift, the same problems occur.

SUMMARY OF THE INVENTION

An object of the present invention is to provide a 3D image display device capable of displaying a 3D image produced by horizontal phase shift so that a 3D effect of a viewer is increased.

Another object of the present invention is to provide a 3D image display device capable of displaying a 3D image produced from a 2D image, a 3D image picked up using two cameras or the like, and a character image and adjusting the front and rear positional relationship between the 3D image and the character image.

A first 3D image display device according to the present invention is characterized by comprising signal converting means for producing from a 2D image signal a left eye image signal and a right eye image signal which constitute a 3D image, first phase adjusting means for shifting the horizontal phase of the left eye image signal produced by the signal converting means, second phase adjusting means for shifting the horizontal phase of the right eye image signal produced by the signal converting means, first mixing means for mixing a character signal with the left eye image signal outputted from the first phase adjusting means, second mixing means for mixing a character signal with the right eye image signal outputted from the second phase adjusting means, and displaying means for displaying a composite image comprising the 3D image and the character signal on the basis of outputs of the first mixing means and the second mixing means.

Examples of the signal converting means include means for producing from a 2D image signal a first image signal used as a basis and a second image signal obtained by delaying the first image signal by a predetermined number of fields, and producing one of the first image signal and the second image signal as a left eye image signal and producing the other image signal as a right eye image signal.

The character signal mixed with the left eye image signal by the first mixing means and the character signal mixed with the right eye image signal by the second mixing means may be the same signals between which there is no binocular parallax, or may be signals between which there is binocular parallax.

There may be provided means for judging whether the image displayed by the displaying means is a 3D image or a 2D image and determining whether or not the character signals are respectively mixed with the left eye image signal and the right eye image signal on the basis of the results of the judgment.

There may be provided means for judging whether the image displayed by the displaying means is a 3D image or a 2D image and changing the type of the character signal on the basis of the results of the judgment.

In the first 3D image display device according to the present invention, the 3D image which is produced from the 2D image and whose phase is adjusted and a character image based on the character signal can be synthesized and displayed.

Consequently, the position of a reference surface of the 3D image displayed by the displaying means is easy to know by comparing the 3D image which is produced from the 2D image and whose phase is adjusted with the character image, whereby a viewer easily experiences a 3D effect. Further, the front and rear positional relationship between the 3D image displayed by the displaying means and the character image can be so adjusted as to be a suitable positional relationship by adjusting the amount of horizontal phase shift.

When the character signals respectively mixed with the right and left eye image signals are the same signals between which there is no binocular parallax, the character image is displayed on the same surface as a monitor surface, whereby the amounts of forward projection and backward projection of the 3D image from the monitor surface are easy to know. Further, when the character signals respectively mixed with the right and left eye image signals are signals between which there is binocular parallax, the character image can exist ahead of the 3D image.

It is determined whether or not the character signals are respectively mixed with the left eye image signal and the right eye image signal and the type of the character signal is changed depending on whether the image displayed by the displaying means is a 2D image or a 3D image, whereby the character image displayed by the character signal can be also utilized as mode display of the displayed image.

A second 3D image display device according to the present invention is characterized by comprising first phase adjusting means for shifting, out of a left eye image signal and a right eye image signal which constitute a 3D image, the horizontal phase of the left eye image signal, second phase adjusting means for shifting the horizontal phase of the right eye image signal, first mixing means for mixing a character signal with the left eye image signal outputted from the first phase adjusting means, second mixing means for mixing a character signal with the right eye image signal outputted from the second phase adjusting means, and displaying means for displaying a composite image comprising the 3D image and the character signal on the basis of outputs of the first mixing means and the second mixing means.

The character signal mixed with the left eye image signal by the first mixing means and the character signal mixed with the right eye image signal by the second mixing means may be the same signals between which there is no binocular parallax, or may be signals between which there is binocular parallax.

In the second 3D image display device according to the present invention, the 3D image which is inputted to the 3D image display device and whose phase is adjusted and a character image based on the character signal can be synthesized and displayed.

Consequently, the position of a reference surface of the 3D image displayed by the displaying means is easy to know by comparing the 3D image which is inputted to the 3D image display device and whose phase is adjusted with the character image, whereby a viewer easily experiences a 3D effect. Further, the front and rear positional relationship between the 3D image displayed by the displaying means and the character image can be so adjusted as to be a suitable positional relationship by adjusting the amount of horizontal phase shift.

When the character signals respectively mixed with the right and left eye image signals are the same signals between which there is no binocular parallax, the character image is displayed on the same surface as a monitor surface, whereby the amounts of forward projection and backward projection of the 3D image from the monitor surface are easy to know. Further, when the character signals respectively mixed with the right and left eye image signals are signals between which there is binocular parallax, the character image can exist ahead of the 3D image.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Referring now to the drawings, a first embodiment of the present invention will be described in detail.
(1) Description of a first embodiment of the present invention.

Figure 1:
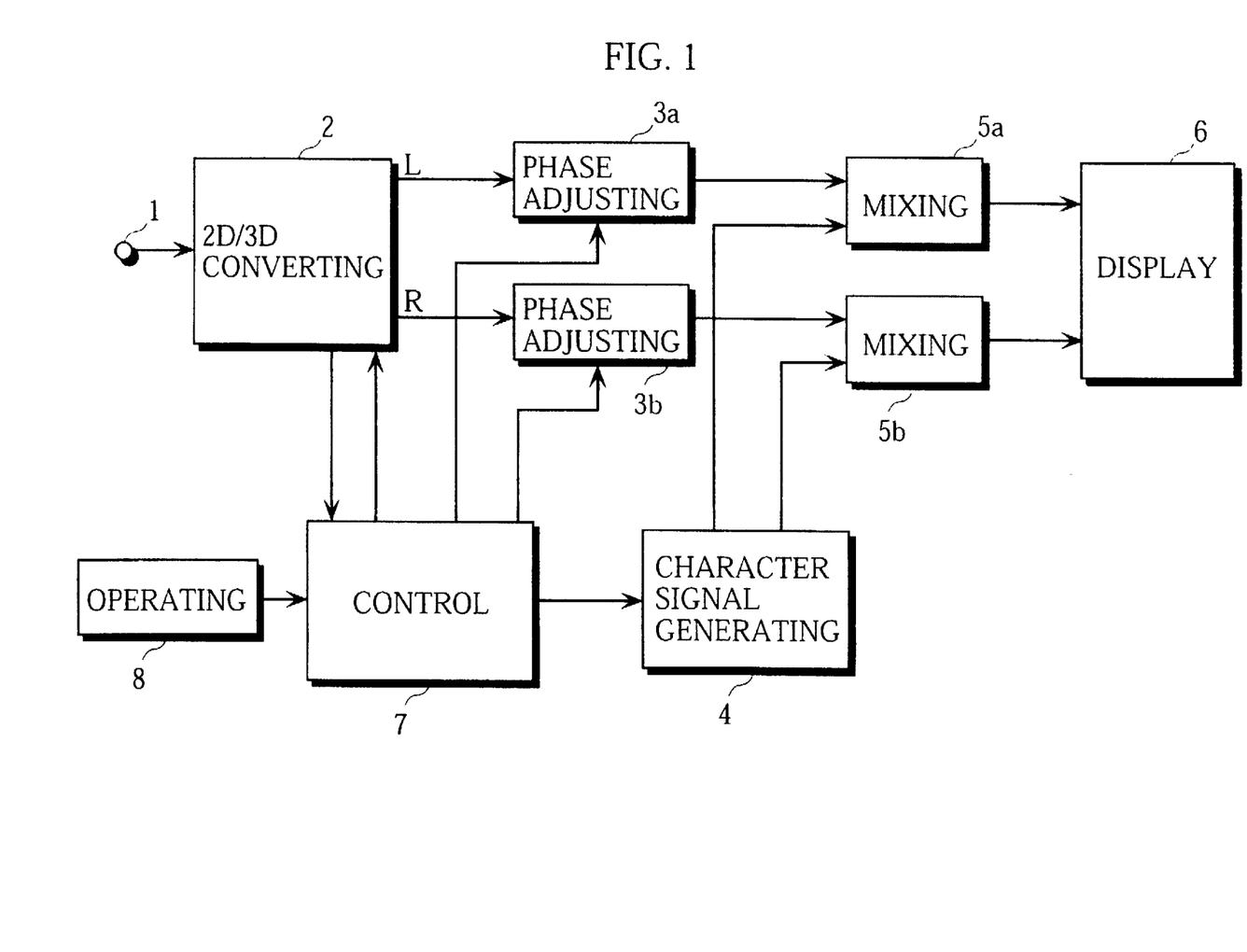
FIG. 1 is a block diagram showing the construction of a 3D image display device according to a first embodiment of the present invention.

FIG. 1 illustrates the construction of a 3D image display device according to a first embodiment of the present invention.

A 2D image signal is inputted to an input terminal 1. The 2D image signal inputted to the input terminal 1 is sent to a 2D/3D converting circuit 2.

The 2D/3D converting circuit 2 converts the inputted 2D image signal into a 3D image signal by a method of producing 3D images using field delay, and outputs a left eye image signal L and a right eye image signal R.

The left eye image signal L produced by the 2D/3D converting circuit 2 is sent to a first phase adjusting circuit 3a. The right eye image signal R produced by the 2D/3D converting circuit 2 is sent to a second phase adjusting circuit 3b.

The first phase adjusting circuit 3a adjusts the horizontal phase of the left eye image signal outputted from the 2D/3D converting circuit 2. The second phase adjusting circuit 3b adjusts the horizontal phase of the right eye image signal outputted from the 2D/3D converting circuit 2.

The first and second phase adjusting circuits 3a and 3b are respectively constituted by line memories. Each of the first and second phase adjusting circuits 3a and 3b delays an input signal for an arbitrary time within one horizontal scanning period, thereby to adjust the position where the readout of data constituting one horizontal line is started within the range of ±48 pixels in the horizontal direction. In the first and second phase adjusting circuits 3a and 3b, the amount of phase shift is adjusted, whereby the amount of binocular parallax is adjusted, and a 3D effect is adjusted.

An output of the first phase adjusting circuit 3a is sent to a first mixing circuit 5a. An output of the second phase adjusting circuit 3b is sent to a second mixing circuit 5b.

A character signal generating circuit 4 outputs character signals for displaying a character image on a display device 6. The character signals outputted from the character signal generating circuit 4 are respectively fed to the first mixing circuit 5a and the second mixing circuit 5b.

The first mixing circuit 5a mixes (superposes or inserts) the character signal with the left eye image signal after phase shift processing. The second mixing circuit 5b mixes (superposes or inserts) the character signal with the right eye image signal after phase shift processing. Outputs of the first mixing circuit 5a and the second mixing circuit 5b are sent to the display device 6.

The display device 6 displays a 3D image or a 2D image on the basis of the left eye image signal (including the character signal) and the right eye image signal (including the character signal) which are respectively outputted from the first mixing circuit 5a and the second mixing circuit 5b.

The display device 6 comprises a signal synthesizing circuit (not shown) for alternately switching and outputting the left eye image signal and the right eye image signal for each field or alternately switching and outputting the left eye image signal and the right eye image signal for each pixel in the horizontal direction.

A control circuit 7 controls field delay of the 2D/3D converting circuit 2 on the basis of an image for each field of the 2D image signal inputted to the input terminal 1. The control circuit 7 controls the amounts of phase shift in the first phase adjusting circuit 3a and the second phase adjusting circuit 3b. In addition, the control circuit 7 controls the operation of the character signal generating circuit 4, for example.

An operating unit 8 sets switching of ON/OFF of the 2D/3D converting circuit 2, the first phase adjusting circuit 3a, the second phase adjusting circuit 3b, and the character signal generating circuit 4, and sets the amounts of phase shift in the first phase adjusting circuit 3a and the second phase adjusting circuit 3b, for example.

Description is made of the operations of the 3D image display device shown in FIG. 1.

A 2D image signal inputted to the input terminal 1 is sent to the 2D/3D converting circuit 2. In the 2D/3D converting circuit 2, a left eye image signal L and a right eye image signal R are produced on the basis of the inputted 2D image signal. Specifically, a first image signal used as a basis and a second image signal which is delayed from the first image signal by a predetermined number of fields are produced on the basis of the inputted 2D image signal, and one of the first image signal and the second image signal is produced as a left eye image signal and the other image signal is produced as a right eye image signal. In this example, the first image signal is the 2D image signal itself inputted to the 2D/3D converting circuit 2.

It is determined which of the first image signal and the second image signal is taken as a left eye image signal on the basis of the direction of the horizontal movement of an object in an inputted 2D image. Field delay indicating how many fields are there from a field corresponding to the first image signal to a field corresponding to the second image signal is determined by the amount of the horizontal movement of the object in the inputted 2D image. Such control is carried out by the control circuit 7.

The left eye image signal L produced by the 2D/3D converting circuit 2 is subjected to horizontal phase shift by a predetermined amount by the first phase adjusting circuit 3a. On the other hand, the right eye image signal R produced by the 2D/3D converting circuit 2 is subjected to horizontal phase shift by a predetermined amount by the second phase adjusting circuit 3b. In this case, the direction of the phase shift is so adjusted that a reference surface of a 3D image is positioned behind a monitor surface. Also with respect to an image in which an object hardly horizontally moves, the reference surface of the 3D image is always positioned behind the monitor surface, whereby a viewer experiences a 3D effect.

The control circuit 7 outputs a character signal for displaying a mark indicating that a 3D image is displayed from the character signal generating circuit 4 upon judgment that the 2D/3D converting circuit 2 is operated.

In the first mixing circuit 5a, the character signal is mixed with the left eye image signal after phase shift processing. On the other hand, in the second mixing circuit 5b, the character signal is mixed with the right eye image signal after phase shift processing. Image signals obtained by the first mixing circuit 5a and the second mixing circuit 5b are sent to the display device 6. In this example, the character signals respectively outputted to the first mixing circuit 5a and the second mixing circuit 5b from the character signal generating circuit 4 shall be the same signals between which there is no binocular parallax.

Figure 2:
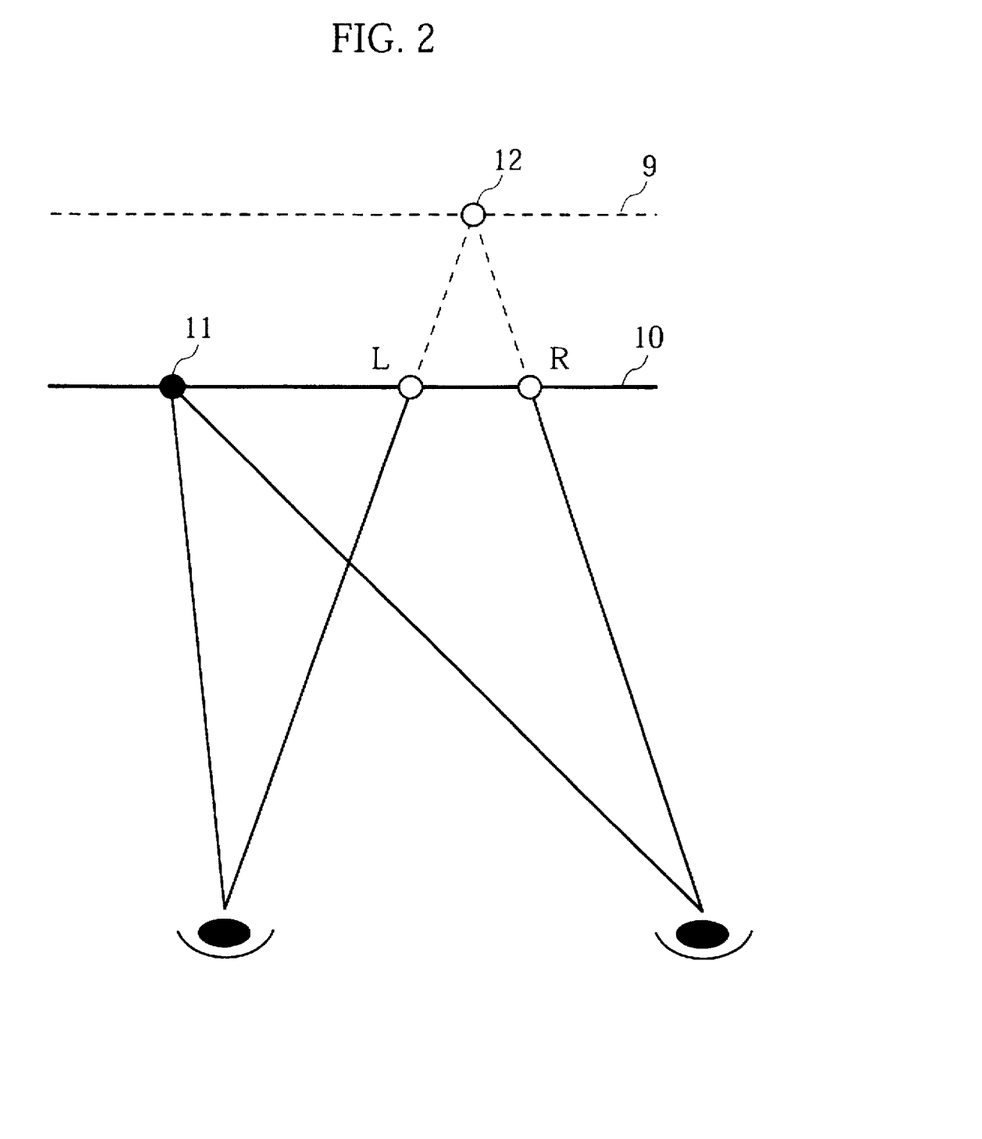
FIG. 2 is a plan view schematically showing the positional relationship among a monitor surface, a character image, and a reference surface of a 3D image in a case where character signals respectively mixed with right and left image signals are the same signals between which there is no binocular parallax.
Figure 3:
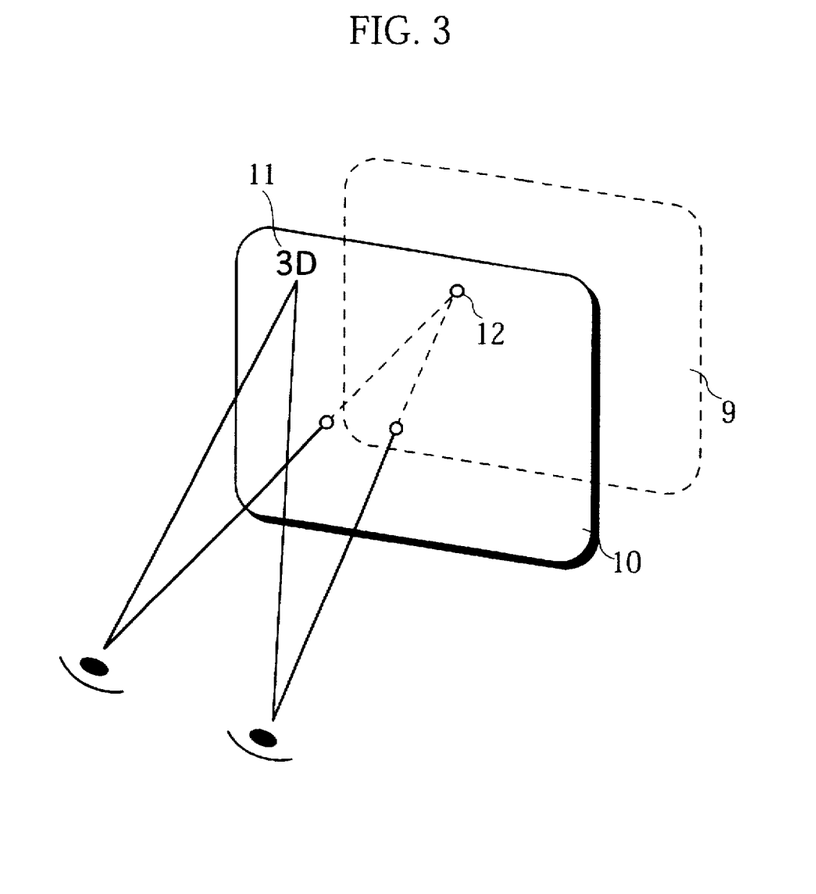
FIG. 3 is a perspective view schematically showing the positional relationship among a monitor surface, a character image, and a reference surface of a 3D image in a case where character signals respectively mixed with right and left image signals are the same signals between which there is no binocular parallax.

FIG. 2 is a plan view schematically showing the distance from a monitor surface to a reference surface of a 3D image displayed on the display device 6. FIG. 3 is a perspective view schematically showing the distance from a monitor surface to a reference surface of a 3D image displayed on the display device 6.

As shown in FIGS. 2 and 3, a reference surface 9 of a displayed 3D image is positioned behind a monitor surface 10 by horizontal phase shift in the phase adjusting circuits 3a and 3b. The character signals respectively fed to the first mixing circuit 5a and the second mixing circuit 5b are the same signals between which there is no binocular parallax, and the character signal is not subjected to phase control, whereby a mark 11 represented by the character signal is displayed on the same surface as the monitor surface 10.

Consequently, the viewer can recognize the position of the monitor surface 10 by the mark 11.

In the 3D image display device according to the first embodiment, the viewer also compares an object 12 which hardly horizontally moves and is so displayed as to be positioned on the reference surface 9 positioned behind the monitor surface 10 by horizontal phase shift with the mark 11, whereby the viewer can easily recognize that the object 12 is positioned behind the mark 11, that is, behind the monitor surface 10 and easily experiences a 3D effect.

Although in the above-mentioned first embodiment, the phase adjusting circuits 3a and 3b are so adjusted that the reference surface 9 of the 3D image is positioned behind the monitor surface 10, the phase adjusting circuits 3a and 3b may be so adjusted that the reference surface 9 is inversely positioned ahead of the monitor surface 10.

The amounts of phase shift in the phase adjusting circuits 3a and 3b may be adjusted fixedly or manually, or may be automatically adjusted depending on the amount of the horizontal movement of the object in the inputted image.

When the mark 11 is a character, a sign or a figure indicating that a 3D image is displayed on the display device 6, it may be automatically judged which of a 2D image and a 3D image is displayed on the display device 6 on the basis of the image signal inputted to the display device 6, and a character signal may be outputted from the character signal generating circuit 4 only when the 3D image is displayed. As a result, the mark 11 is displayed on the display device 6 when the 3D image is displayed on the display device 6, and is not displayed on the display device 6 when the 2D image is displayed on the display device 6.

Furthermore, it may be automatically judged which of a 2D image and a 3D image is displayed on the display device 6 on the basis of the image signal inputted to the display device 6 to change the type of the character signal depending on the results of the judgment.

Figure 4:
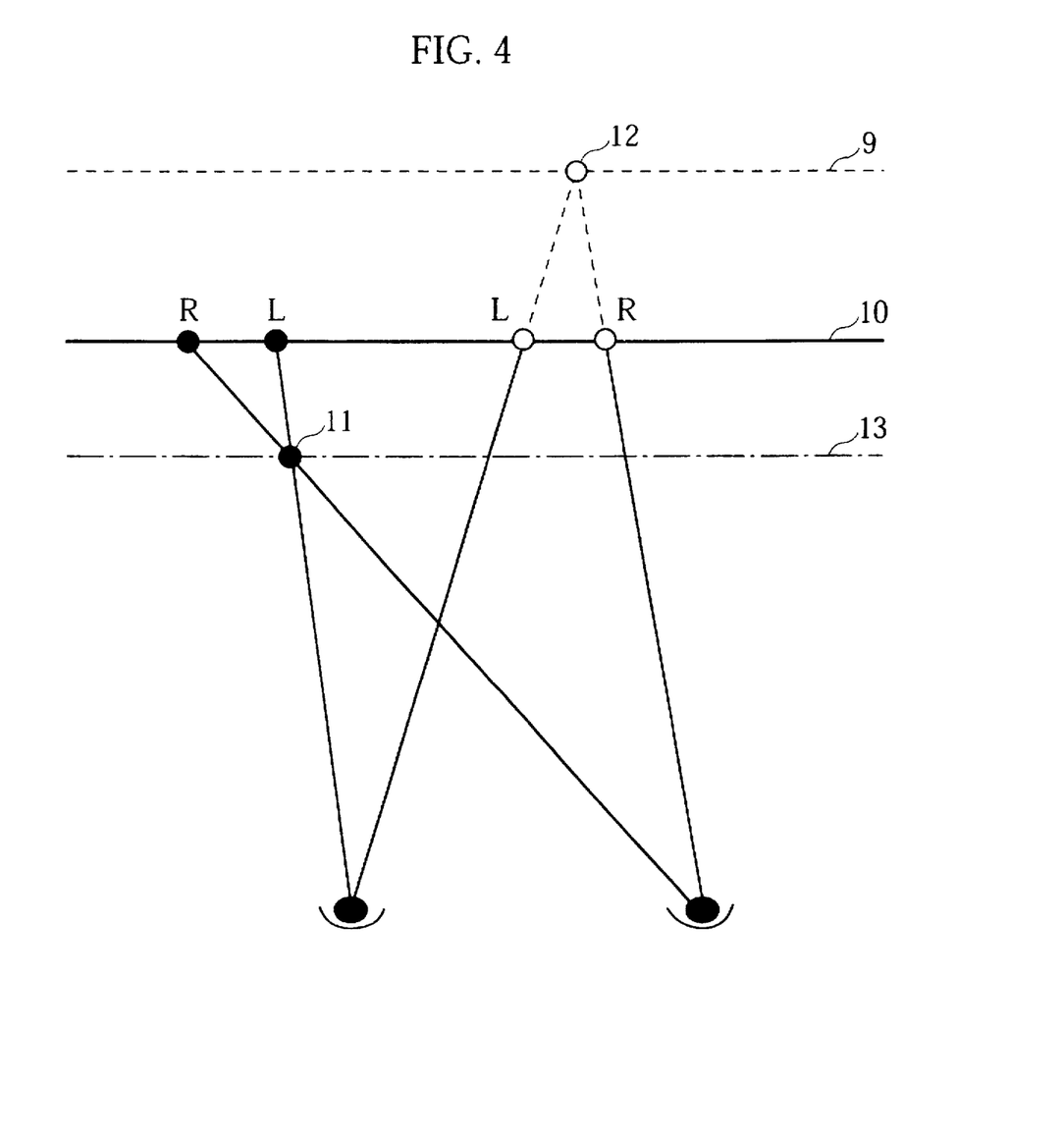
FIG. 4 is a plan view schematically showing the positional relationship among a monitor surface, a character image, and a reference surface of a 3D image in a case where character signals respectively mixed with right and left image signals are the same signals between which there is binocular parallax.

As shown in FIG. 4, when the phase adjusting circuits 3a and 3b are so adjusted that the reference surface 9 of the 3D image is positioned behind the monitor surface 10, character signals between which there is binocular parallax may be respectively fed to the first mixing surface 5a and the second mixing circuit 5b so that the mark 11 is displayed on a surface 13 ahead of the monitor surface 10. Although in the above-mentioned case, the mark 11 is displayed on the surface 13 ahead of the monitor surface 10, the mark 11 may be displayed behind the monitor surface 10. In this case, however, the mark 11 must be positioned ahead of the foremost position in 3D view of the 3D image or in approximately the same position as the foremost position in 3D view of the 3D image. On the other hand, when the phase adjusting circuits 3a and 3b are so adjusted that the reference surface 9 of the 3D image is positioned ahead of the monitor surface 10, character signals between which there is binocular parallax may be respectively fed to the first mixing circuit 5a and the second mixing circuit 5b so that the mark 11 is displayed ahead of the foremost position in 3D view of the 3D image or in approximately the same position as the foremost position in 3D view of the 3D image.

(2) Description of a second embodiment of the present invention

Figure 5:
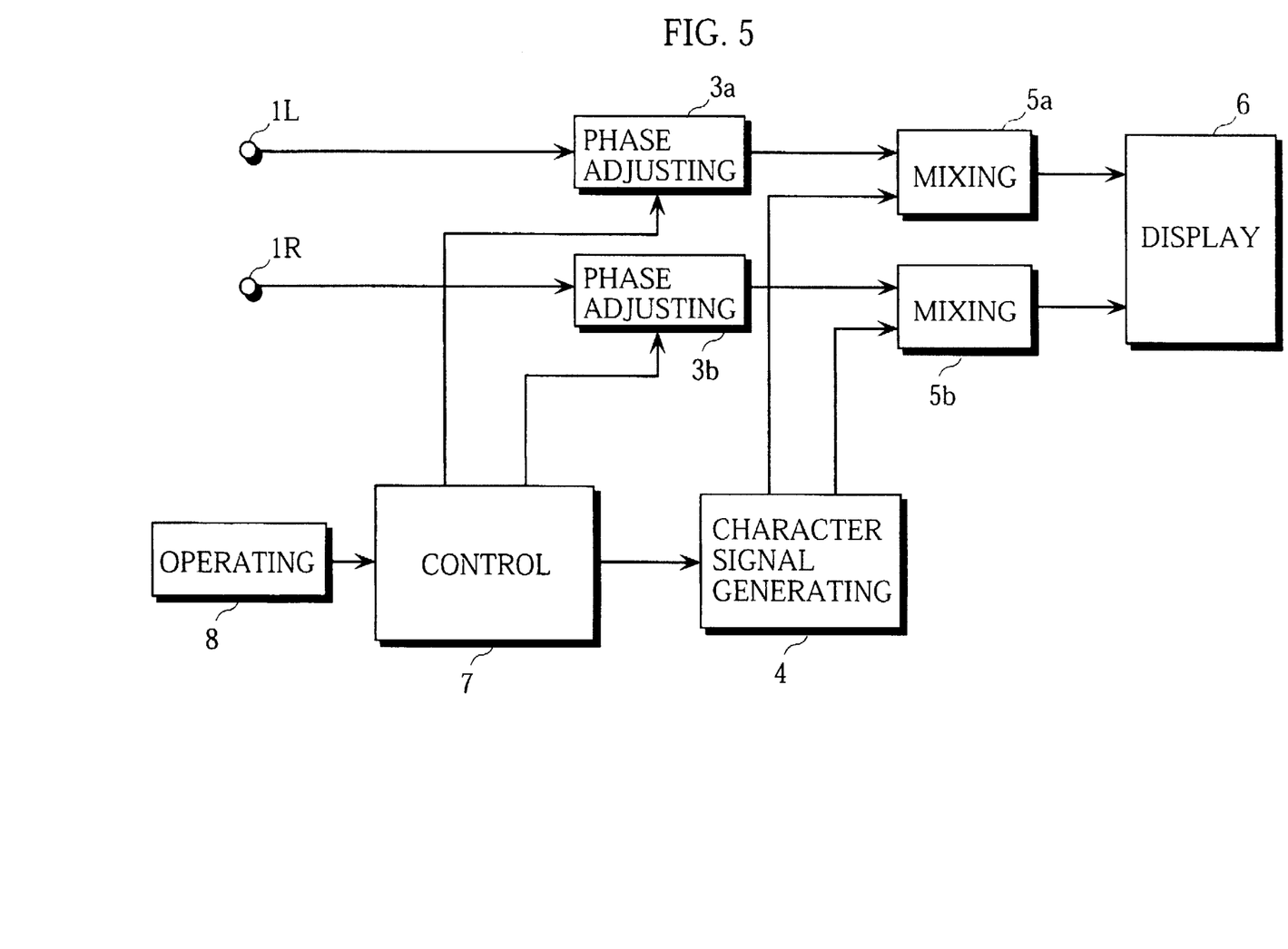
FIG. 5 is a block diagram showing the construction of a 3D image display device according to a second embodiment of the present invention.

FIG. 5 illustrates the construction of a 3D image display device according to a second embodiment of the present invention. In FIG. 5, the same reference numerals as those shown in FIG. 1 are assigned the same reference numerals and hence, the description thereof is not repeated.

In the second embodiment, a 3D image picked up using two cameras, for example, is inputted. That is, a left eye image is picked up using one of the two cameras, and a right eye image is picked up using the other camera.

A left eye image signal thus obtained is inputted to a left eye input terminal 1L, and a right eye image signal is inputted to a right eye input terminal 1R.

The left eye image signal inputted to the left eye input terminal 1L is subjected to horizontal phase shift by a predetermined amount by a first phase adjusting circuit 3a. On the other hand, the right eye image signal inputted to the right eye input terminal 1R is subjected to horizontal phase shift by a predetermined amount by a second phase adjusting circuit 3b. Consequently, a reference surface of a 3D image is so adjusted as to be positioned behind a monitor surface.

The left eye image signal whose phase is shifted is fed to a display device 6 after a character signal from a character signal generating circuit 4 is mixed therewith by a first mixing circuit 5a. On the other hand, the right eye image signal whose phase is shifted is fed to the display device 6 after the character signal from the character signal generating circuit 4 is mixed therewith by a second mixing circuit 5b.

In the above-mentioned 3D image display device according to the first or second embodiment, the amounts of phase shift by the phase adjusting circuits 3a and 3b are adjusted, whereby it is possible to adjust the front and rear positional relationship between the 3D image displayed on the display device 6 and a character image displayed by the character signal.

For example, when a character image in a window frame shape is displayed by a character signal and a 3D image is displayed inside the character image, a viewer can adjust the front and rear positional relationship between the character image in a window frame shape and the 3D image so that the 3D image exists behind the character image by changing the amounts of phase shift in the phase adjusting circuits 3a and 3b by the operating unit 8.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional image display device comprising:

signal converting means for producing from a two-dimensional image signal a left eye image signal and a right eye image signal which constitute a three-dimensional image, wherein said signal converting means takes the two-dimensional image and an image delayed from the two-dimensional image along a time base as the right eye image and left eye image, respectively, if the two-dimensional image is a moving image, and takes the two-dimensional image and an image in which a horizontal phase of the two-dimensional is shifted as the right eye image and the left eye image, respectively, if the two-dimensional image is a still image;

first phase adjusting means for controlling the horizontal phase of the left eye image signal produced by said signal converting means;

second phase adjusting means for controlling the horizontal phase of the right eye image signal produced by said signal converting means;

first mixing means for mixing a two-dimensional character signal with the left eye image signal outputted from said first phase adjusting means;

second mixing means for mixing a two-dimensional character signal with the right eye image signal outputted from said second phase adjusting means; and displaying means for displaying a composite image comprising said three-dimensional image and said character signal on the basis of outputs of said first mixing means and said second mixing means, wherein said two-dimensional character signal mixed with the left eye image signal by said first mixing means and said two-dimensional character signal mixed with the right eye image signal by said second mixing means are the same signals between which there is no binocular parallax.

* * * * *